United States Patent
Sasaki et al.

(10) Patent No.: US 11,662,680 B2
(45) Date of Patent: May 30, 2023

(54) IMAGE FORMING APPARATUS IN WHICH COLORS ARE DEVELOPED WITH MULTIPLE COLOR DEVELOPMENT LAYERS, CONTROL METHOD THEREOF, AND NON-TRANSITORY COMPUTER-READABLE STORAGE MEDIUM

(71) Applicant: Canon Kabushiki Kaisha, Tokyo (JP)

(72) Inventors: Takeru Sasaki, Kanagawa (JP); Hiroaki Ogawa, Kanagawa (JP); Takashi Fujita, Tokyo (JP); Okinori Tsuchiya, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/119,090

(22) Filed: Dec. 11, 2020

(65) Prior Publication Data
US 2021/0141328 A1    May 13, 2021

Related U.S. Application Data

(63) Continuation of application No. PCT/JP2019/018336, filed on May 8, 2019.

(30) Foreign Application Priority Data

Jun. 12, 2018 (JP) .............................. JP2018-112218

(51) Int. Cl.
*B41J 2/315* (2006.01)
*B41J 2/355* (2006.01)
(Continued)

(52) U.S. Cl.
CPC ................ *G03G 15/50* (2013.01); *B41J 2/21* (2013.01); *B41J 2/315* (2013.01); *B41J 2/32* (2013.01);
(Continued)

(58) Field of Classification Search
CPC ..... G03G 15/50; G03G 15/0184; B41J 2/315; B41J 2/3558; B41J 2/32; B41J 2/355; B41J 2/36; B41J 2/21; B41J 29/393; G06F 3/12
See application file for complete search history.

(56) References Cited

U.S. PATENT DOCUMENTS

| | | | |
|---|---|---|---|
| 4,789,872 A | 12/1988 | Hosoi | ........................... 347/175 |
| 5,774,162 A | 6/1998 | Fukuda | |

(Continued)

FOREIGN PATENT DOCUMENTS

| | | |
|---|---|---|
| CN | 1537059 | 10/2004 |
| CN | 1579788 | 2/2005 |

(Continued)

OTHER PUBLICATIONS

International Search Report and Written Opinion, dated Jun. 11, 2019, in International Application No. PCT/JP2019/018336.

(Continued)

*Primary Examiner* — Yaovi M Ameh
(74) *Attorney, Agent, or Firm* — Venable LLP

(57) ABSTRACT

An image forming apparatus includes a printhead configured to add energy to an image material; and a control unit configured to output, based on image data, a signal pattern for controlling energy to be added by the printhead to the image material including a plurality of color development layers that have different color development characteristic and develop colors in accordance with the added energy. When causing at least two of the plurality of color development layers to develop colors, the control unit generates, based on at least two signal patterns generated to cause the at least two color development layers to develop colors, a signal pattern of an OR of the at least two signal patterns and outputs the signal pattern.

18 Claims, 11 Drawing Sheets

(51) Int. Cl.
  *G03G 15/00* (2006.01)
  *G03G 15/01* (2006.01)
  *B41J 2/32* (2006.01)
  *B41J 2/21* (2006.01)
  *G06F 3/12* (2006.01)
  *B41J 2/36* (2006.01)
  *B41J 29/393* (2006.01)

(52) U.S. Cl.
  CPC ............ *B41J 2/355* (2013.01); *B41J 2/3558* (2013.01); *G03G 15/0184* (2013.01); *G06F 3/12* (2013.01); *B41J 2/36* (2013.01); *B41J 29/393* (2013.01)

(56) References Cited

U.S. PATENT DOCUMENTS

| | | | |
|---|---|---|---|
| 7,436,545 B2 | 10/2008 | Tomioka et al. | 358/1.9 |
| 7,635,660 B2 | 12/2009 | Bhatt et al. | 503/204 |
| 8,502,848 B2 | 8/2013 | Busch et al. | 347/221 |
| 2001/0002138 A1* | 5/2001 | Inui | B41J 2/36 347/183 |
| 2003/0125206 A1 | 7/2003 | Bhatt et al. | |
| 2006/0030484 A1 | 2/2006 | Kim et al. | |
| 2007/0218375 A1* | 9/2007 | Ito | G03G 9/08793 430/108.1 |
| 2008/0056793 A1* | 3/2008 | Yokoyama | B41J 13/009 400/120.02 |
| 2008/0238967 A1* | 10/2008 | Busch | B41J 2/5056 347/11 |
| 2010/0099556 A1 | 4/2010 | Vetterling et al. | |
| 2019/0377277 A1 | 12/2019 | Ogawa et al. | B41J 2/365 |
| 2020/0016904 A1 | 1/2020 | Fujita et al. | B41J 2/525 |
| 2020/0016905 A1 | 1/2020 | Tsuchiya et al. | B41J 2/3558 |
| 2021/0141328 A1 | 5/2021 | Sasaki et al. | G03G 15/50 |

FOREIGN PATENT DOCUMENTS

| | | |
|---|---|---|
| CN | 101495319 | 7/2009 |
| EP | 0508871 | 10/1992 |
| EP | 1070593 | 1/2001 |
| JP | S62-274867 | 11/1987 |
| JP | H06-115249 A | 4/1994 |
| JP | H10-93792 A | 4/1998 |
| JP | 2000-168116 | 6/2000 |
| JP | 2001-162853 | 6/2001 |
| JP | 2002-347269 | 12/2002 |
| JP | 4677431 B2 | 4/2011 |
| JP | 2013-506582 A | 2/2013 |
| JP | 2019-214206 | 12/2019 |
| WO | 2011/044049 A1 | 4/2011 |

OTHER PUBLICATIONS

Office Action dated Sep. 9, 2021 in counterpart Chinese Application No. 201980039031.9.

Office Action dated Dec. 23, 2022 in counterpart Japanese Application No. 2020-200504, together with English translation thereof.

* cited by examiner

CONVEYANCE DIRECTION

WIDTH DIRECTION

IMAGE FORMING APPARATUS IN WHICH COLORS ARE DEVELOPED WITH MULTIPLE COLOR DEVELOPMENT LAYERS, CONTROL METHOD THEREOF, AND NON-TRANSITORY COMPUTER-READABLE STORAGE MEDIUM

CROSS-REFERENCE TO RELATED APPLICATIONS

This application is a Continuation of International Patent Application No. PCT/JP2019/018336, filed May 8, 2019, which claims the benefit of Japanese Patent Application No. 2018-112218, filed Jun. 12, 2018, both of which are hereby incorporated by reference herein in their entirety.

BACKGROUND OF THE INVENTION

Field of the Invention

The present invention relates to an image forming apparatus, a control method thereof, and a non-transitory computer-readable storage medium.

Background Art

Conventionally, monochrome printing using thermosensible paper, color printing using an ink ribbon, and the like are known concerning a thermal printer. Additionally, in recent years, color image formation using a sheet including a plurality of color development layers corresponding to a plurality of colors has been provided to the market and become popular as a printing means for a photo or the like.

The plurality of color development layers provided on the sheet have different color development characteristics and develop colors in accordance with given energy (heating temperature and heating time). For example, in Japanese Patent Laid-Open No. 2013-506582 or Japanese Patent No. 4677431, a color image is formed by causing a specific color development layer to develop a color using the difference between the color development characteristics of the color development layers.

However, in the conventional method, energies for color development are individually added to cause the color development layers to develop colors in order. For this reason, time is needed until color development of all color development layers corresponding to image data is completed.

SUMMARY OF THE INVENTION

The present invention has the following arrangement to solve the above-described problem. According to an aspect of the present invention, there is provided an image forming apparatus comprising a printhead configured to add energy to an image material, and a control unit configured to output, based on image data, a signal pattern for controlling energy to be added by the printhead to the image material including a plurality of color development layers that have different color development characteristics and develop colors in accordance with the added energy, wherein when causing at least two of the plurality of color development layers to develop colors, the control unit generates, based on at least two signal patterns generated to cause the at least two color development layers to develop colors, a signal pattern of an OR of the at least two signal patterns and outputs the signal pattern.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

An embodiment of the present invention will now be described in detail with reference to the accompanying drawings. It should be noted that arrangements and the like to be described below are merely examples and are not intended to limit the scope of the present invention.

First Embodiment

Image Material

Figure 1:
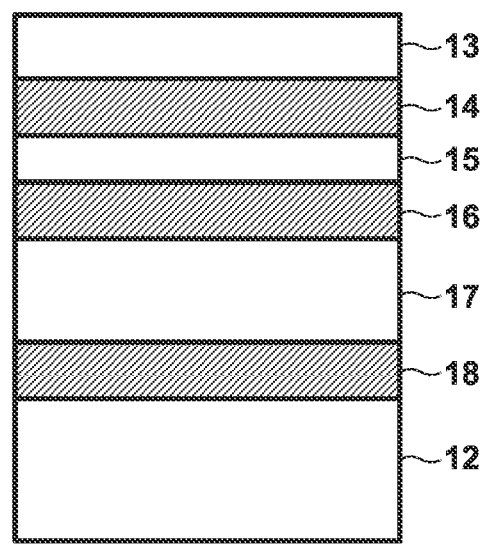
FIG. 1 is a view for explaining an image material according to the embodiment.

FIG. 1 is a conceptual view for explaining the structure of an image material according to this embodiment. In this embodiment, a description will be made using an infrared imaging method using infrared radiation as the heat source of an image forming apparatus. However, another method or heat source may be used.

Referring to FIG. 1, in an image material 10 that is an image forming body, a base material 12 that reflects light, an image forming layer 18, a spacer layer 17, an image forming layer 16, a spacer layer 15, an image forming layer 14, and a protective film layer 13 are formed sequentially from the lowermost layer. In general, the image forming layers 14, 16, and 18 are yellow, magenta, and cyan, respectively, in full color printing. However, a combination of other colors is also possible. That is, in the example shown in FIG. 1, image forming layers (color development layers) corresponding to three colors are provided. However, more image forming layers may be provided.

Each image forming layer is colorless at first (before image formation), and changes to a corresponding color when it is heated to a specific temperature called the activation temperature of the image forming layer. In this embodiment, the color development characteristics for color development in the image forming layers are different. The order (layering order) of the colors of the image forming layers in the image material 10 can arbitrarily be selected. One suitable color order is as described above. As another suitable order, the three image forming layers 14, 16, and 18 are cyan, magenta, and yellow, respectively. In this embodiment, an explanation will be made using an example in which the colors are arranged in the above-described order of yellow, magenta, and cyan. Note that in FIG. 1, the image forming layers are layered in the same thickness. However, the present invention is not limited to this, and the thickness may be changed in accordance with the color (color material).

Additionally, as shown in FIG. 1, spacer layers are provided between the image forming layers. The thickness of each spacer layer may be defined in accordance with the color development characteristic of each image forming layer, the heat conduction characteristic or thermal diffusivity of each layer, and the like. For example, the spacer layers may be made of the same material or different materials. The function of the spacer layers is control of thermal diffusion in the image material 10. Suitably, if the spacer layer 17 is made of the same material as the spacer layer 15, the spacer layer 17 is preferably at least four times thicker.

All the layers arranged on the base material 12 are substantially transparent before image formation. If the base material 12 has a reflective color (for example, white), a color image formed by the image material 10 is visually recognized through the protective film layer 13 against the reflective background provided by the base material 12. Since the layers layered on the base material 12 are transparent, a human can visually recognize the combinations of colors printed on the image forming layers.

The three image forming layers 14, 16, and 18 in the image material 10 according to this embodiment are arranged on the same side of the base material 12. However, some image forming layers may be arranged on the opposite side of the base material 12.

In this embodiment, the image forming layers 14, 16, and 18 are at least partially independently processed based on changes in two parameters adjustable in the image forming apparatus, that is, a temperature and time. As for these parameters, the time and the temperature of the printhead when applying heat to the image material 10 are controlled, thereby forming an image on a desired image forming layer. That is, when the time and the temperature added to the image material 10 are controlled, a desired image forming layer can be caused to develop a color of a desired density.

In this embodiment, each of the image forming layers 14, 16, and 18 is processed when the printhead applies heat while contacting the uppermost layer of the image material 10, that is, the protective film layer 13 shown in FIG. 1. The color development characteristic of each image forming layer according to this embodiment will be described. Let Ta3, Ta2, and Ta1 be the activation temperatures of the image forming layers 14, 16, and 18, respectively. In this case, the activation temperature (Ta3) of the image forming layer 14 is higher than the activation temperature (Ta2) of the image forming layer 16, and is also higher than the activation temperature (Ta1) of the image forming layer 18. The relationship between the activation (color development characteristics) of the image forming layers will be described later with reference to FIG. 2.

Heating of the image forming layers located at longer distances from the printhead (that is, the protective film layer 13) delays by the time necessary for heating because the heat is conducted and diffused to the layers through the spacer layers. Hence, even if the temperature added from the printhead to the surface (that is, the protective film layer 13) of the image material 10 is substantially lower than the activation temperature of the image forming layer located at a lower position (the layer located far apart from the printhead), control can be performed not to activate the image forming layer on the lower side while heating up to the activation temperature for the image forming layer closer to the printhead because of the delay of heating caused by heat diffusion by the layers. For this reason, when processing (developing the color) only the image forming layer 14 closest to the protective film layer 13, the printhead is heated up to a relatively high temperature (Ta3 or more) in a short time. In this case, insufficient heating is performed for both of the image forming layers 16 and 18, and color development (activation) of these is not performed.

When activating only the image forming layer (in this case, the image forming layer 16 or 18) close to the base material 12, the image forming layer is heated for a sufficiently long period at a temperature lower than the activation temperature of the image forming layer (for example, the image forming layer 14) farther apart from the base material 12. In this way, when the lower image forming layer (image forming layer 16 or 18) is activated, the higher image forming layer (for example, the image forming layer 14) is not activated.

As described above, heating of the image material 10 is preferably performed using a thermal printhead. However, another method may be used. For example, any known means such as a modulated light source (a means such as a laser) may be used.

Color Development Characteristic

Figure 2:
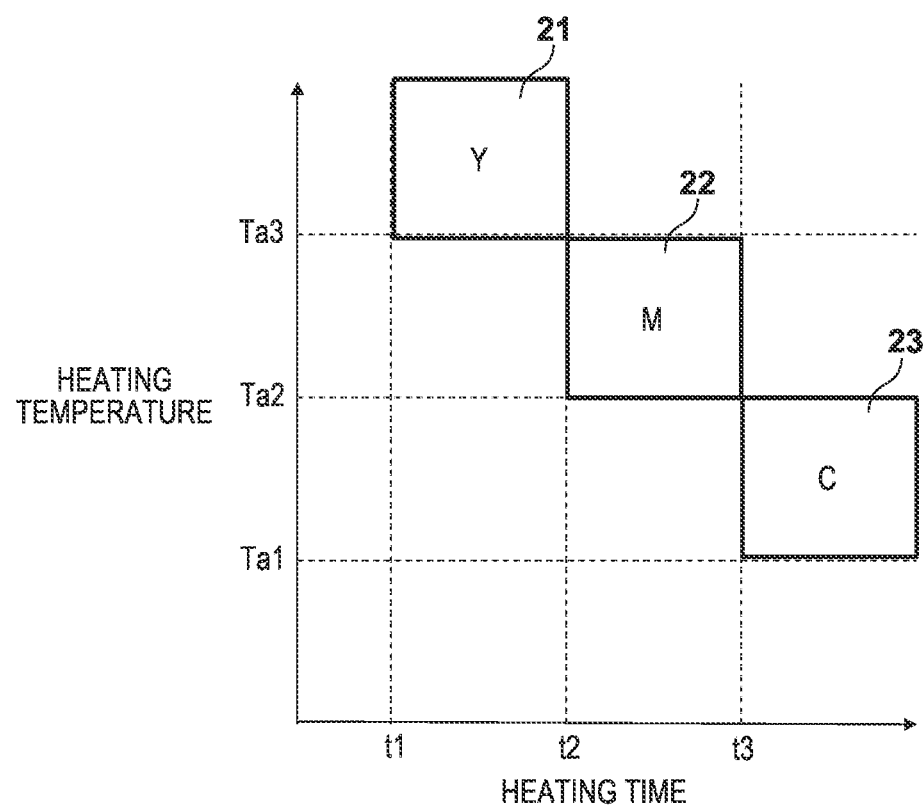
FIG. 2 is a view for explaining an example of the arrangement of a printhead according to the embodiment.

FIG. 2 is a view for explaining the relationship between heating temperatures and heating times necessary for processing the image forming layers 14, 16, and 18, which form the image material 10. Referring to FIG. 2, the ordinate axis represents a heating temperature on the surface of the image material 10 that comes into contact with the printhead, and the abscissa axis represents heating time. A description will be made here assuming that the heating temperature is the same as the temperature supplied by the printhead.

A region 21 represents a relatively high heating temperature and a relatively short heating time. In this embodiment, the region 21 corresponds to yellow of the image forming layer 14. That is, in the image forming layer 14, color development (image formation) is performed when the energy represented by the region 21 is supplied. A region 22 represents an intermediate heating temperature and an intermediate heating time. The region 23 corresponds to magenta of the image forming layer 16. That is, in the image forming layer 16, color development (image formation) is performed when the energy represented by the region 22 is supplied. A region 23 represents a relatively low heating temperature and a relatively long heating time. The region 22 corresponds to cyan of the image forming layer 18. That is, in the image forming layer 18, color development (image formation) is performed when the energy represented by the region 23 is supplied. The time necessary for imaging (color development) of the image forming layer 18 is substantially longer than the time necessary for imaging of the image forming layer 14.

As the activation temperature selected for an image forming layer, for example, a temperature within the range of about 90° C. to about 300° C. is used. For the thermal stability of the image material 10, the activation temperature (Ta1) of the image forming layer 18 is preferably constantly low as much as possible during shipment and storage, and is suitably about 100° C. or more. The activation temperature (Ta3) of the image forming layer 14, through which the image forming layers 16 and 18 are heated and activated, is preferably constantly high, and is suitably about 200° C. or more. The activation temperature (Ta2) of the image forming layer 16 is a temperature between Ta1 and Ta3, and is suitably about 140° C. to about 180° C.

Note that in each image forming layer, even if the energy in the corresponding region is added, the density of the formed color changes depending on the position in the region. For example, in a case in which the energy in the region 22 is given to the image forming layer 16, even if the heating time is the same, an image of a high density is formed by giving a temperature close to Ta3 as compared to a case in which a temperature close to Ta2 is given. This also applies to a case in which the heating time varies.

Printhead

The printhead according to this embodiment includes a substantially linear array of resistors extending across the width of an image. In this embodiment, the printhead extends in a direction (the width direction of the image material 10) orthogonal to the conveyance direction of the image material 10, and the resistors are provided along the width direction. Note that the width of the printhead may be shorter than the image. In this case, to process the image across its width, the printhead may be configured to move relative to the image material 10 that is a target image forming body, or may be used together with another printhead.

When a current is supplied to the resistors included in the printhead, the resistors operate as a heat source. When the image material 10 is conveyed while receiving the heat from the resistors of the printhead, imaging is performed in each image forming layer in accordance with the received heat. As described above, in this embodiment, the resistors are configured to be able to irradiate the image material with infrared radiation. The time in which the printhead applies heat to the image material 10 typically ranges from about 0.001 to about 100 milliseconds for each line of the image. The upper limit is set in consideration of the balance to the printing time. The lower limit is defined by the restrictions of an electronic circuit (not shown). The interval of dots that form the image generally ranges from 100 to 600 lines per inch in both the conveyance direction and the width direction of the image material 10. Different intervals may be set in these directions.

Figure 3A:
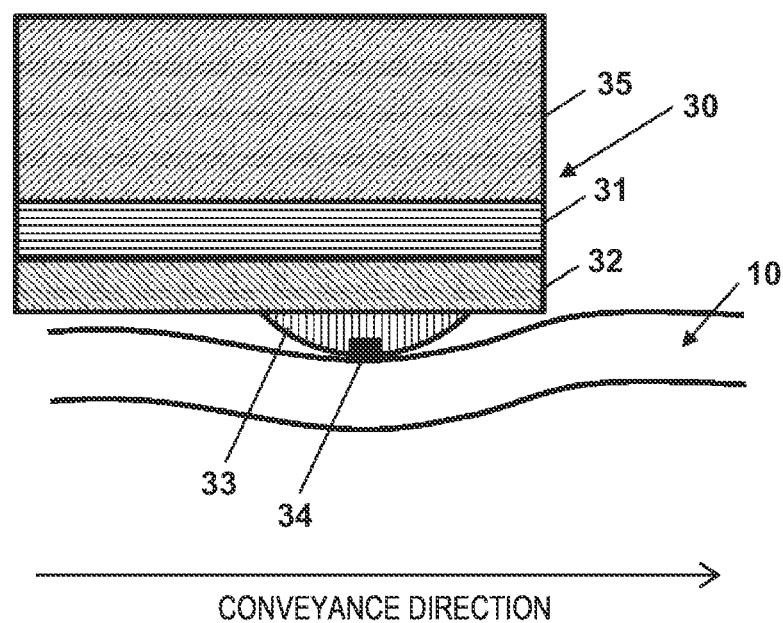
FIG. 3A is a view showing the sectional arrangement of an image forming apparatus according to the embodiment.
Figure 3B:
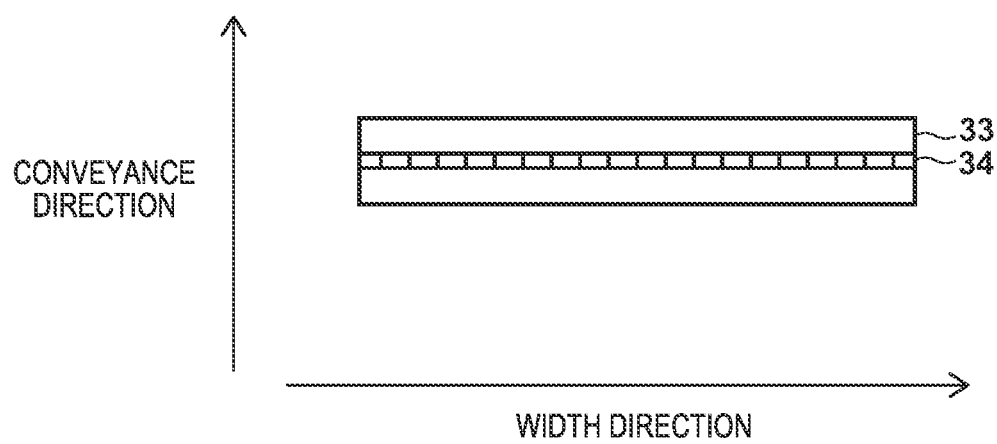
FIG. 3B is a view showing the sectional arrangement of an image forming apparatus according to the embodiment.

FIGS. 3A and 3B are views showing the printhead at the time of image formation and an example of the arrangement of the image material 10 according to this embodiment. Referring to FIG. 3A, the image material 10 is conveyed rightward at the time of image formation. The above-described width direction of the image material 10 corresponds to the depth direction in FIG. 3A. A printhead 30 includes a glaze 32 on a base 31. Additionally, in this embodiment, the glaze 32 further includes a convex glaze 33. A resistor 34 is arranged on the surface of the convex glaze 33, and is arranged so as to come into contact with the image material 10 conveyed in the conveyance direction. Note that the convex glaze 33 may have another shape or may be not provided. In this case as well, the resistor 34 is configured to come into contact with the image material 10. Note that a protective film layer (not shown) is preferably formed on the resistor 34, the glaze 32, and the convex glaze 33. The combination of the glaze 32 and the convex glaze 33, which are made of the same material, will generally be referred to as "the glaze of the printhead" hereinafter.

The base 31 and a heat sink 35 are provided on the glaze 32. The base 31 is in contact with the heat sink 35 and is cooled by a cooling unit (not shown) such as a fan. In general, the image material 10 comes into contact with the glaze of the printhead longer than the length of the actual heating resistor in the conveyance direction. A typical resistor has a length of about 120 μm in the conveyance direction of the image material 10. The thermal contact area between the image material 10 and the glaze of the general printhead is 200 μm or more.

FIG. 3B is a view showing an example of the array of the resistors 34 in the width direction. A plurality of resistors 34 are arrayed in the width direction and thus have a predetermined length in the width direction of the image material 10. An image of one line is formed along the array. In an example shown below, while conveying the image material 10 in the conveyance direction, an image is formed on a line basis.

Image Forming Apparatus

Figure 4:
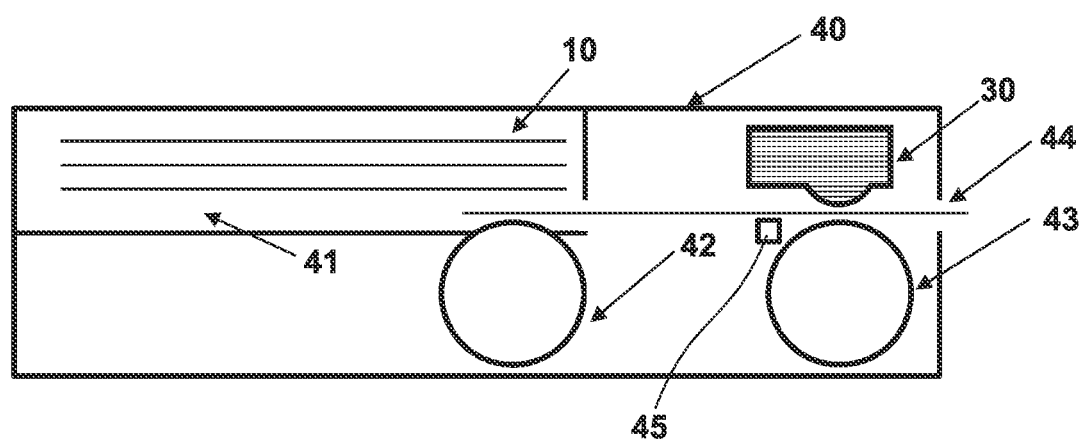
FIG. 4 is a view showing an example of a system arrangement according to the embodiment.

FIG. 4 is a sectional view showing an example of the arrangement of an image forming apparatus according to this embodiment. An image forming apparatus 40 includes the printhead 30, a storage unit 41, a conveyance roller 42, a platen 43, a discharge port 44, and a temperature sensor 45. A plurality of image materials 10 can be stored as printing media in the storage unit 41. The image material 10 can be replenished by opening/closing a cover (not shown). At the time of printing, the image material 10 is fed to the printhead 30 by the conveyance roller 42, undergoes image formation between the platen 43 and the printhead 30, and is then discharged from the discharge port 44. The printing is thus completed. In addition, the temperature sensor 45 is provided on the periphery of the nip portion between the printhead 30 and the platen 43, and detects the temperature supplied by the printhead 30. Note that the target to be detected by the temperature sensor 45 may be, for example, the temperature of the resistor 34 (heat source) included in the printhead 30, or may be the surface temperature of the image material 10. In addition, the temperature sensor 45 is not limited to an arrangement for detecting the temperature of only one portion, and may be configured to detect temperatures of a plurality of portions. Furthermore, the temperature sensor 45 may be configured to detect the environmental temperature of the image forming apparatus 40.

The conveyance speed of the image material 10 is controlled based on the speed of image formation, the resolution at the time of image formation, and the like. For example, when forming a high-resolution image, the conveyance speed may be lowered as compared to a case of forming a low-resolution image. When priority is given to the printing speed, the conveyance speed may be increased, and the resolution may be reduced.

System Arrangement

Figure 5:
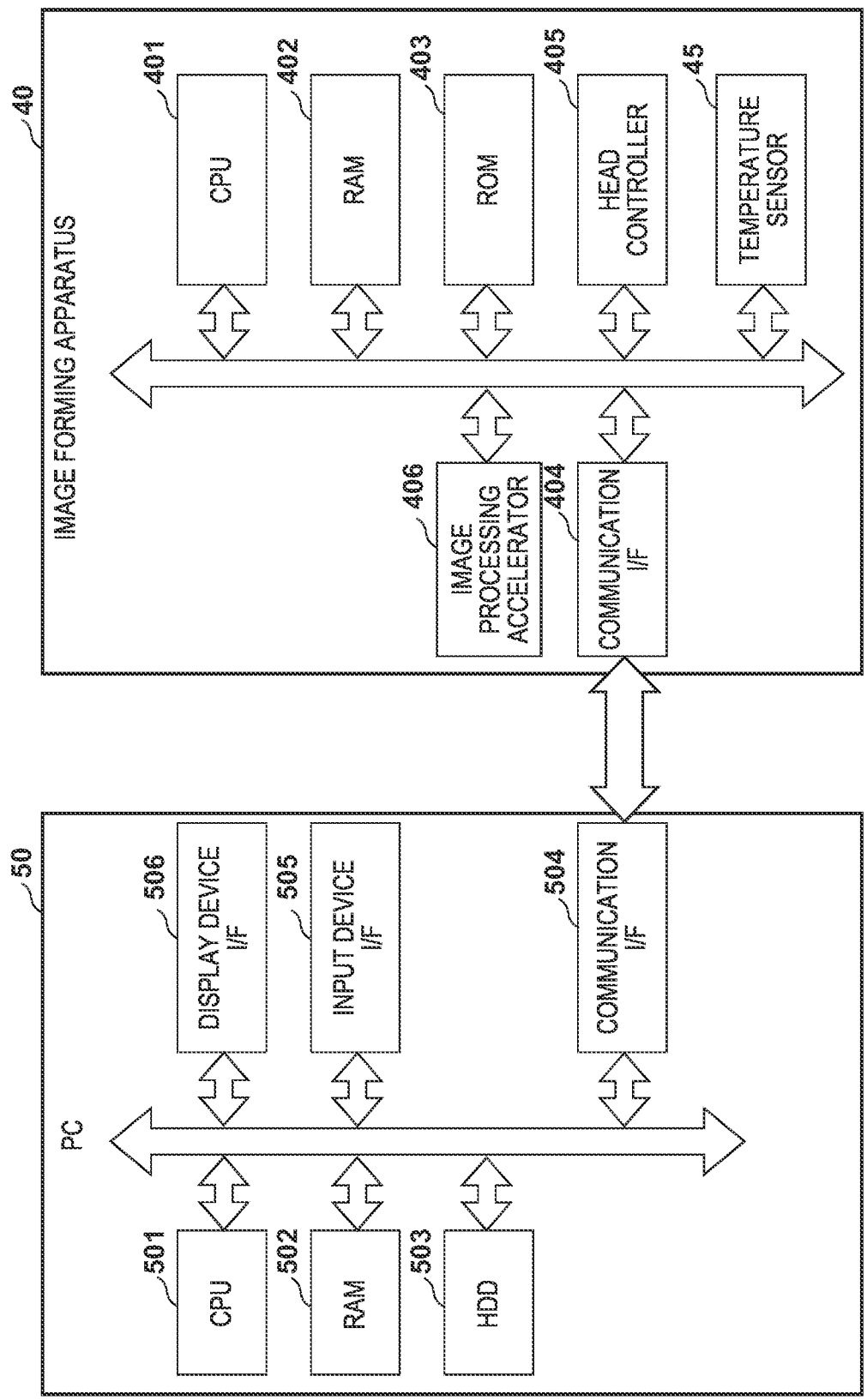
FIG. 5 is a view for explaining the color development characteristic in the image material according to the embodiment.

FIG. 5 is a view showing an example of the overall arrangement of a system according to this embodiment. As shown in FIG. 5, the system according to this embodiment includes the image forming apparatus 40 shown in FIG. 4, and a personal computer (PC) 50 serving as a host device for the apparatus.

The PC 50 includes a CPU (Central Processing Unit) 501, a RAM (Read Only Memory) 502, an HDD (Hard Disk Drive) 503, a communication I/F 504, an input device I/F 505, and a display device FF. The portions are connected so as to be communicable with each other via an internal bus. The CPU 501 executes processing according to programs and various kinds of data held in the HDD 503 and the RAM 502. The RAM 502 is a volatile storage, and temporarily holds programs and data. The HDD 503 is a nonvolatile storage, and holds programs and data.

The communication I/F 504 is an interface configured to control communication with an external device, and controls data transmission/reception to/from the image forming apparatus 40 here. As the connection method of data transmission/reception here, wired connection such as USB, IEEE1394, or LAN (Local Area Network) or wireless connection such as Bluetooth®, or WiFi® can be used. The input device I/F 505 is an interface configured to control an HID (Human Interface Device) such as a keyboard or a mouse, and accepts an input from an input device by the user. A display device I/F 506 controls display on a display device such as a display (not shown).

The image forming apparatus 40 includes a CPU 401, a RAM 402, a ROM 403, a communication I/F 404, a head controller 405, an image processing accelerator 406, and the temperature sensor 45. The portions are connected so as to be communicable with each other via an internal bus. The CPU 401 executes processing according to each embodiment to be described later in accordance with programs and various kinds of data held in the ROM 403 and the RAM 402. The RAM 402 is a volatile storage, and temporarily holds programs and data. The ROM 403 is a nonvolatile storage, and holds table data and programs used in processing to be described later.

The communication I/F 404 is an interface configured to control communication with an external device, and controls data transmission/reception to/from the PC 50 here. The head controller 405 controls, based on print data, the heating operation for the printhead 30 shown in FIGS. 3A and 3B. More specifically, the head controller 405 can be configured to load control parameters and print data from a predetermined address of the RAM 402. When the CPU 401 writes the control parameters and the print data to a predetermined address of the RAM 402, processing is activated by the head controller 405, and the heating operation of the printhead 30 is performed.

The image processing accelerator 406 is formed by hardware, and executes image processing at a speed higher than that of the CPU 401. More specifically, the image processing accelerator 406 can be configured to load parameters and data necessary for image processing from a predetermined address of the RAM 402. When the CPU 401 writes the parameters and the data at a predetermined address of the RAM 402, the image processing accelerator 406 is activated, and predetermined image processing is performed. Note that the image processing accelerator 406 is not an always necessary element, and the above-described table parameter creation processing and image processing may be executed only by the processing of the CPU 401 in accordance with the specifications of the printer or the like. In addition, the temperature sensor 45 detects the ambient temperature of the resistor 34 of the printhead 30, as shown in FIG. 4, and provides the temperature information to the CPU 401 and the like. Based on the acquired temperature information, the CPU 401 generates control parameters for controlling heat generation of the resistor 34. Detailed control will be described later.

Note that in this embodiment, the image forming apparatus 40 and the PC 50 have been described as different apparatuses. However, for example, these may be integrated to form the system, or the system may integrate the image forming apparatus 40 and an image capturing device (not shown). In addition, the PC has been exemplified as the host device. However, the present invention is not limited to this, and for example, a portable terminal such as a smartphone, a tablet terminal, or an image capturing device may be used.

Print Service

Figure 6:
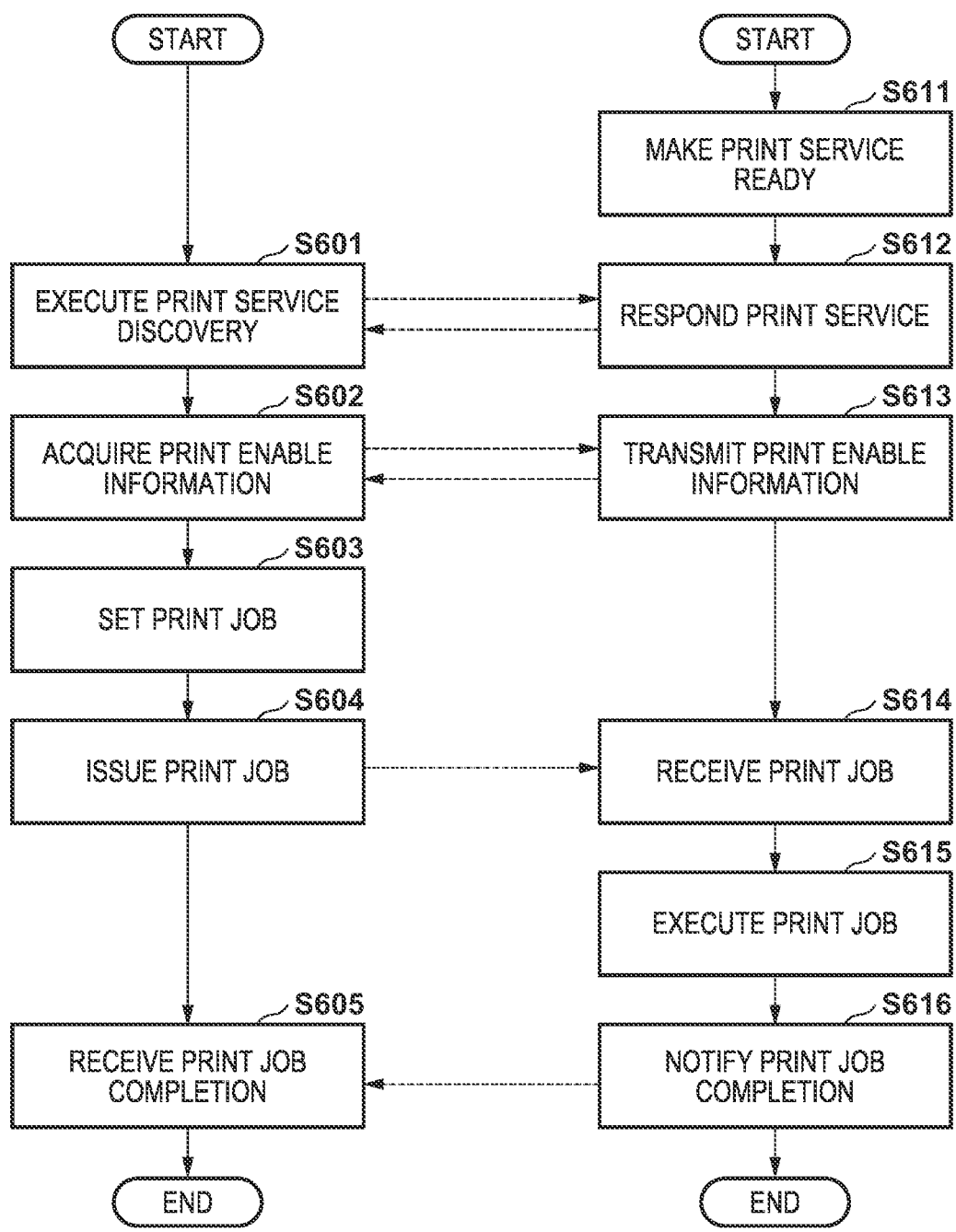
FIG. 6 is a sequence chart of a print service according to the embodiment.

FIG. 6 shows a sequence when executing a print service in the system according to this embodiment. In FIG. 6, steps S601 to S605 represent processing in the PC 50, and steps S611 to S616 represent processing of the image forming apparatus 40. Additionally, in FIG. 6, broken line arrows represent transmission/reception of data. The steps are implemented when the CPUs of the apparatuses read out programs held in the storage units and execute them. This sequence is started when the user is going to execute printing.

In step S611, after power on, the image forming apparatus 40 confirms that it can perform printing, determines that a print service can be provided, and transitions to a wait state.

On the other hand, in step S601, the PC 50 executes print service Discovery. In the print service Discovery here, a peripheral device may be searched for in accordance with a user operation, or an image forming apparatus in a state that is capable of providing a print service may periodically be searched for. Alternatively, when the PC 50 and the image forming apparatus 40 are connected, the PC 50 may send a query.

In step S612, upon receiving the print service Discovery from the PC 50, as a response to this, the image forming apparatus 40 notifies the PC 50 that the image forming apparatus 40 is a device capable of providing a print service.

In step S602, upon receiving, from the image forming apparatus 40, the notification representing that a print service can be provided, the PC 50 requests print enable information for the image forming apparatus.

In step S613, as a response to the request of print enable information from the PC 50, the image forming apparatus 40 notifies the PC 50 of the information of the print service that the image forming apparatus can provide.

Upon receiving the print enable information from the image forming apparatus 40, in step S603, the PC 50 constructs a user interface for print job creation based on the print enable information. More specifically, based on the print enable information of the image forming apparatus 40, the PC 50 performs appropriate display of a print image designation, a print size, a printable sheet size, and the like and providing of appropriate options to the user via a display (not shown). Then, the PC 50 accepts settings from the user via an input device (not shown) such as a keyboard.

In step S604, the PC 50 issues a print job based on the settings accepted from the user, and transmits it to the image forming apparatus 40.

In step S614, the image forming apparatus 40 receives the print job from the PC 50.

In step S615, the image forming apparatus 40 analyzes and executes the received print job. Details of image formation for the print job according to this embodiment will be described later.

When printing is completed, in step S616, the image forming apparatus 40 notifies the PC 50 of the printing completion. The processing on the side of the image forming apparatus 40 is thus completed, and the image forming apparatus 40 transitions to a wait state.

In step S605, the PC 50 receives the printing completion notification, and notifies the user of it. The processing on the side of the PC 50 is thus completed.

Note that in the above explanation, as for various kinds of information transmission, a communication example in which a request is sent from the side of the PC 50 to the image forming apparatus 40, and the image forming apparatus 40 responds to the request has been described. However, the present invention is not limited to a so-called Pull-type communication example as described above. A so-called Push-type communication in which the image forming apparatus 40 spontaneously performs the transmission to one or a plurality of PCs 50 existing on the network may be used.

Control of image formation according to this embodiment will be described below. In this embodiment, heating control is performed by outputting, from the head controller 405, a signal (pulse signal) configured to apply a current to the resistor 34 provided on the printhead 30, thereby performing image formation.

Conventional Heating Pulses

Figure 7:
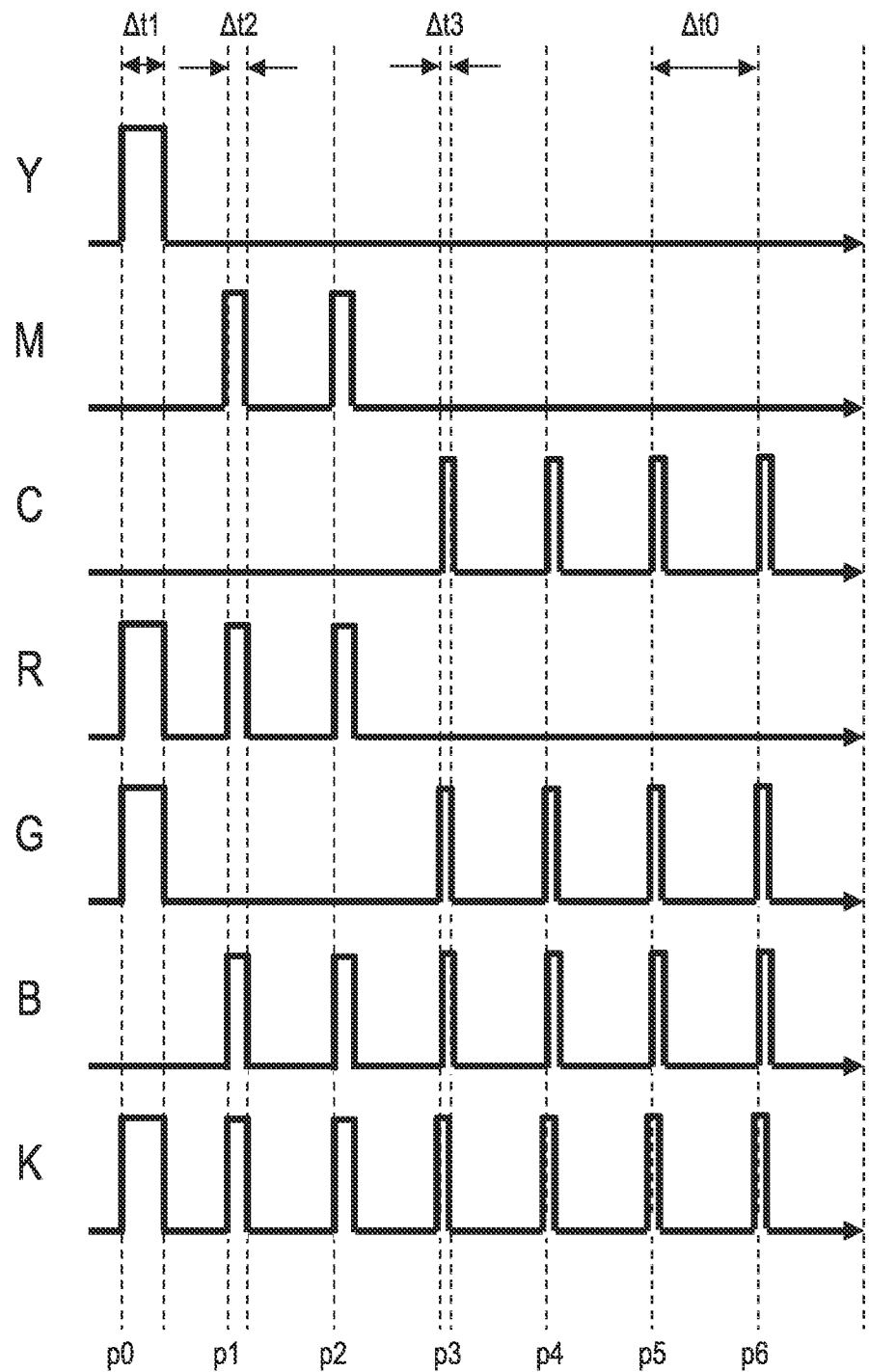
FIG. 7 is a view for explaining the arrangement of conventional heating pulses.

Signals used in conventional heating control will be described first as a comparative example to the present invention. FIG. 7 shows an example of signal patterns (heating pulses) corresponding to the colors which are applied to the printhead of a conventional image forming apparatus. FIG. 7 shows colors to be developed in the image material 10 in one pixel and an example of the arrangement of heating pulses at this time. FIG. 7 shows yellow (Y), magenta (M), cyan (C), red (R), green (G), blue (B), and black (K) sequentially from the upper side. In FIG. 7, a heating pulse for one pixel includes seven sections (p0 to p6), and the length of one section is $\Delta t0$. That is, the time of the heating pulse needed to form one pixel is $\Delta t0 \times 7$ sections (p0 to p6). That is, for color development of one pixel, the number of cycles of pulses corresponding to seven sections are used. Color development is controlled by a pulse signal train included in this.

In FIG. 7, each signal exhibits two values by High and Low (ON and OFF). At High, heating by the resistor 34 is performed. At Low, heating is not performed. Color development is controlled by controlling the pulse widths of pulses included in the heating pulse for each color and the number of pulses. In this embodiment, the pulse width of each pulse is adjusted by PWM (Pulse width modulation) control. A description will be made by setting the start point of each section as the rise timing (ON timing) of a pulse, as shown in FIG. 7.

For example, for color development of yellow (Y), heating is performed for a time $\Delta t1$ to implement the region 21 (a relatively high heating temperature and a relatively short heating time) shown in FIG. 2. In addition, for color development of magenta (M), heating is executed for a time $\Delta t2$ twice in total at an interval to implement the region 22 (an intermediate heating temperature and an intermediate heating time) shown in FIG. 2. Here, the interval between the first pulse and the second is ($\Delta t0 - \Delta t2$). Similarly, for color development of cyan (C), heating is executed for a time $\Delta t3$ four times in total at an interval to implement the region 23 (a relatively low heating temperature and a relatively long heating time) shown in FIG. 2. Here, the interval between the first pulse and the second is ($\Delta t0 - \Delta t3$). By providing the interval, it is possible to suppress an increase in the temperature of the image material 10 beyond the target temperature (activation temperature). In other words, the target temperature is maintained by controlling the ON time and the OFF time.

In FIG. 7, for easy understanding, a relationship given by $$\Delta t1 = \Delta t2 \times 2 = \Delta t3 \times 4$$

is set, and the total time of heating pulses applied to the printhead 30 is the same regardless of the color to be developed. Assume that t1 to t3 and Ta1 to Ta3 to be described below correspond to the description of FIG. 2.

As for the heating times,
t2>heating time $\Delta t1$ of Y>t1
t3>heating time $\Delta t2$ of M+$\Delta t0$>t2
heating time $\Delta t3$ of C+$\Delta t0 \times 3$>t3
hold, and the relative relationship between the heating times is given by

Y<M<C

Here, the energy (heat amount) applied to the image material 10 by the printhead 30 is thermally conducted to the glaze 32 (and the convex glaze 33), the base 31, and the heat sink 35 of the printhead 30 shown in FIGS. 3A and 3B in the interval time of each signal. For this reason, the temperature of the image material 10 lowers during the interval time. Similarly, since the heat amount thermally conducted into the image material 10 propagates the heat to the periphery of the platen 43 and the like shown in FIG. 4 as well, the temperature of the image material 10 lowers accordingly. As a result, in a case in which the applied energy (heat amount) is the same, the peak temperatures by heating hold a relationship given by

Y>M>C

Here, when control is performed to satisfy
peak temperature of Y>Ta3
Ta3>peak temperature of M>Ta2
Ta2>peak temperature of C>Ta1
the colors Y, M, and C can be developed independently.

Heating pulses that control the color development of R, G, and B that are secondary colors and K that is a tertiary color will be described next. Here, an Nth-degree color means a color expressed by developing N color materials (image forming layers) and combining them.

For red (R) shown in FIG. 7, the heating pulse is controlled to develop yellow (Y)→magenta (M) in this order. That is, the image forming layer 14 corresponding to yellow (Y) and the image forming layer 16 corresponding to magenta (M) are caused to develop the colors, thereby forming an image of red (R). Additionally, for green (G) shown in FIG. 7, the heating pulse is controlled to develop yellow (Y)→cyan (C) in this order. Similarly, for blue (B) shown in FIG. 7, the heating pulse is controlled to develop magenta (M)→cyan (C) in this order. For black (K) shown in FIG. 7, the heating pulse is controlled to develop yellow (Y)→magenta (M)→cyan (C) in this order.

In the above-described conventional method, to print one pixel, the heating pulses need to be controlled individually on a color basis to develop yellow (Y)→magenta (M)→cyan (C) in this order. For this reason, there are restrictions on regions that can develop colors. In the example shown in FIG. 7, of the seven pulses p0 to p6, the pulse that can be used to develop yellow (Y) is only one pulse p0. Similarly, only two pulses are usable for magenta (M), and only four pulses are usable for cyan (C). That is, the time for causing a certain image forming layer to develop a color is limited relative to the heating time (p0 to p6) usable for one pixel, and a wasteful time is included. As a result, as the time of heating pulses necessary to form one pixel, a time corresponding to $\Delta t0 \times 7$ sections (p0 to p6) is needed. However, energy addition is limited, and the area ratio of color development on the image material 10 lowers. For this reason, the color development is insufficient.

Heating Pulses According to this Embodiment

The basic arrangement of heating pulses according to this embodiment will be described next with reference to FIG. 8.

Figure 8:
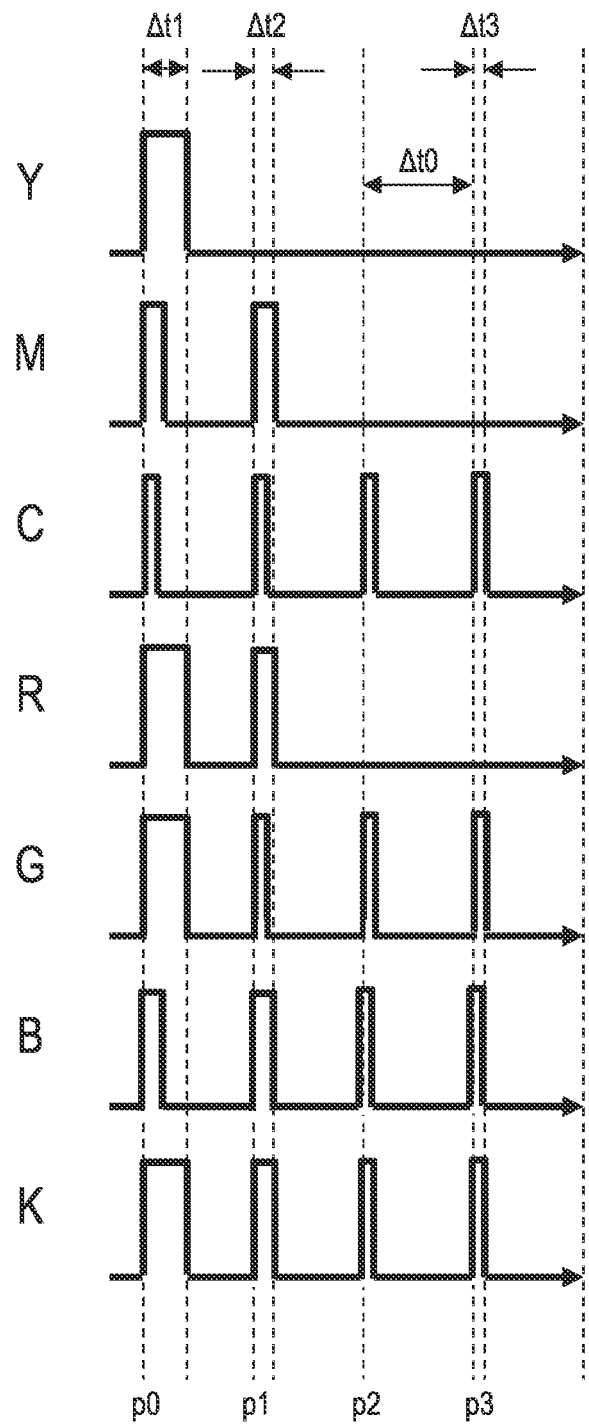
FIG. 8 is a view for explaining an example of the arrangement of heating pulses according to the embodiment.

In the control shown in FIG. 8, heating pulses of yellow (Y), magenta (M), and cyan (C) are superimposed. "Superimpose" here means that when making a plurality of color materials (image forming layers) develop colors to reproduce a secondary color, a tertiary color, or the like, the OR of pulses corresponding to the color components is calculated, thereby deciding the pulse widths and the number of pulses of the heating pulses. A description will be made assuming that $\Delta t0$, $\Delta t1$, $\Delta t2$, and $\Delta t3$ shown in FIG. 8 are the same as in FIG. 7 for the sake of simplicity. Note that the pulse widths and the interval periods ($\Delta t0$, $\Delta t1$, $\Delta t2$, $\Delta t3$, and the like) may be decided in accordance with the cooling characteristic of the interval time derived from the printhead 30 or other structures.

In this embodiment, the colors (image forming layers) shown in FIG. 7 are developed not individually but simultaneously in parallel. Hence, the time of heating pulses necessary for color development per pixel is a time corresponding to $\Delta t0 \times 4$ pulses (p0 to p4). It is therefore considered that the color development efficiency, that is, the color development degree per pixel of each of yellow (Y), magenta (M), and cyan (C) is improved as compared to that shown in FIG. 7. Additionally, in this embodiment, when the heating pulses are superimposed, the color development efficiency of each of red (R), green (G), and blue (B) that are secondary colors and the black (K) that is a tertiary color is improved. These will be described below in order.

A description will be made first concerning red (R). For red (R) in FIG. 8, heating pulses of yellow (Y) and magenta (M) in FIG. 8 are superimposed. In red (R) shown in FIG. 8, the heating pulse that contributes to color development of the yellow (Y) component is one pulse p0 in the four pulses p0 to p3. On the other hand, in red (R) shown in FIG. 7, the heating pulse that contributes to color development of the yellow (Y) component is one pulse p0 in the seven pulses p0 to p6. Additionally, in red (R) shown in FIG. 8, the heating pulses that contribute to color development of the magenta (M) component are two pulses p0 and p1 in the four pulses p0 to p3. On the other hand, in red (R) shown in FIG. 7, the heating pulses that contribute to color development of the magenta (M) component are three pulses p0, p1, and p2 in the seven pulses p0 to p6. When FIGS. 7 and 8 are compared, the ratio of the number of heating pulses contributing to color development to the total number of pulses becomes high in the control shown in FIG. 8 for both yellow (Y) and magenta (M). It is therefore considered that the color development efficiency is higher in red (R) shown in FIG. 8.

A description will be made next concerning green (G). For green (G) in FIG. 8, heating pulses of yellow (Y) and cyan (C) in FIG. 8 are superimposed. In green (G) shown in FIG. 8, the heating pulse that contributes to color development of the yellow (Y) component is one pulse p0 in the four pulses p0 to p3. On the other hand, in green (G) shown in FIG. 7, the heating pulse that contributes to color development of the yellow (Y) component is one pulse p0 in the seven pulses p0 to p6. Additionally, in green (G) shown in FIG. 8, the heating pulses that contribute to color development of the cyan (C) component are four pulses p0 to p3 in the four pulses p0 to p3. On the other hand, in green (G) shown in FIG. 7, the heating pulses that contribute to color development of the cyan (C) component are four pulses p3 to p6 in the seven pulses p0 to p6. When FIGS. 7 and 8 are compared, the ratio of the number of heating pulses contributing to color development to the total number of pulses becomes high in the control shown in FIG. 8 for both yellow (Y) and cyan (C). It is therefore considered that the color development efficiency is higher in green (G) shown in FIG. 8.

A description will be made next concerning blue (B). For blue (B) in FIG. 8, heating pulses of magenta (M) and cyan (C) in FIG. 8 are superimposed. In blue (B) shown in FIG. 8, the heating pulses that contribute to color development of the magenta (M) component are two pulses p0 and p1 in the four pulses p0 to p3. On the other hand, in blue (B) shown in FIG. 7, the heating pulses that contribute to color development of the magenta (M) component are two pulses p1 and p2 in the seven pulses p0 to p6. Additionally, in blue (B) shown in FIG. 8, the heating pulses that contribute to color development of the cyan (C) component are four pulses p0 to p3 in the four pulses p0 to p3. On the other hand, in blue (B) shown in FIG. 7, the heating pulses that contribute to color development of the cyan (C) component are six pulses p1 to p6 in the seven pulses p0 to p6. When FIGS. 7 and 8 are compared, the ratio of the number of heating pulses contributing to color development to the total number of pulses becomes high in the control shown in FIG. 8 for both magenta (M) and cyan (C). It is therefore considered that the color development efficiency is higher in blue (B) shown in FIG. 8.

A description will be made next concerning black (K). For black (K) in FIG. 8, heating pulses of yellow (Y), magenta (M), and cyan (C) in FIG. 8 are superimposed. In black (K) shown in FIG. 8, the heating pulse that contributes to color development of the yellow (Y) component is one pulse p0 in the four pulses p0 to p3. On the other hand, in black (K) shown in FIG. 7, the heating pulse that contributes to color development of the yellow (Y) component is one pulse p0 in the seven pulses p0 to p6. Additionally, in black (K) shown in FIG. 8, the heating pulses that contribute to color development of the magenta (M) component are two pulses p0 and p1 in the four pulses p0 to p3. On the other hand, in black (K) shown in FIG. 7, the heating pulses that contribute to color development of the magenta (M) component are three pulses p0, p1, and p2 in the seven pulses p0 to p6. Additionally, in black (K) shown in FIG. 8, the heating pulses that contribute to color development of the cyan (C) component are four pulses p0 to p3 in the four pulses p0 to p3. On the other hand, in black (K) shown in FIG. 7, the heating pulses that contribute to color development of the cyan (C) component are seven pulses p0 to p6 in the seven pulses p0 to p6. When FIGS. 7 and 8 are compared, the ratio of the number of heating pulses contributing to color development to the total number of pulses becomes high in the control shown in FIG. 8 for yellow (Y) and magenta (M). On the other hand, in cyan (C), since the ratio of the number of heating pulses contributing color development to the total number of pulses is almost equal in FIGS. 7 and 8, and the color development efficiency is almost equal. Hence, because of the difference in the color development efficiency between the yellow (Y) component and the magenta (M) component, the color development efficiency is higher in black (K) shown in FIG. 8.

That is, in other words, in the secondary color or the tertiary color, control of improving color development can be performed concerning a color material such as cyan (C) or magenta (M) with the color development characteristics shown in FIG. 2. Also, as shown in FIG. 8, in this embodiment, the time of heating pulses necessary for color development per one pixel formed by the cyan (C) component, the magenta (M) component, and the yellow (Y) component corresponds to the number of cycles for $\Delta t0 \times 4$ pulses (p0 to p4). As described above, in this embodiment, the number of cycles can be made smaller than the number of cycles shown in FIG. 7 by "superimposing" pulse signals. At this time, as for the pulse signals acting on the color development layers (image forming layers 14, 16, and 18) corresponding to the cyan (C) component, the magenta (M) component, and the yellow (Y) component shown in FIG. 1, cyan (C) is developed by four pulse signals equal to the number of cycles. The remaining magenta (M) and yellow (Y) can be developed by pulse signals (one pulse signal and two pulse signals) in number smaller than the number of cycles.

Processing Procedure

Figure 9:
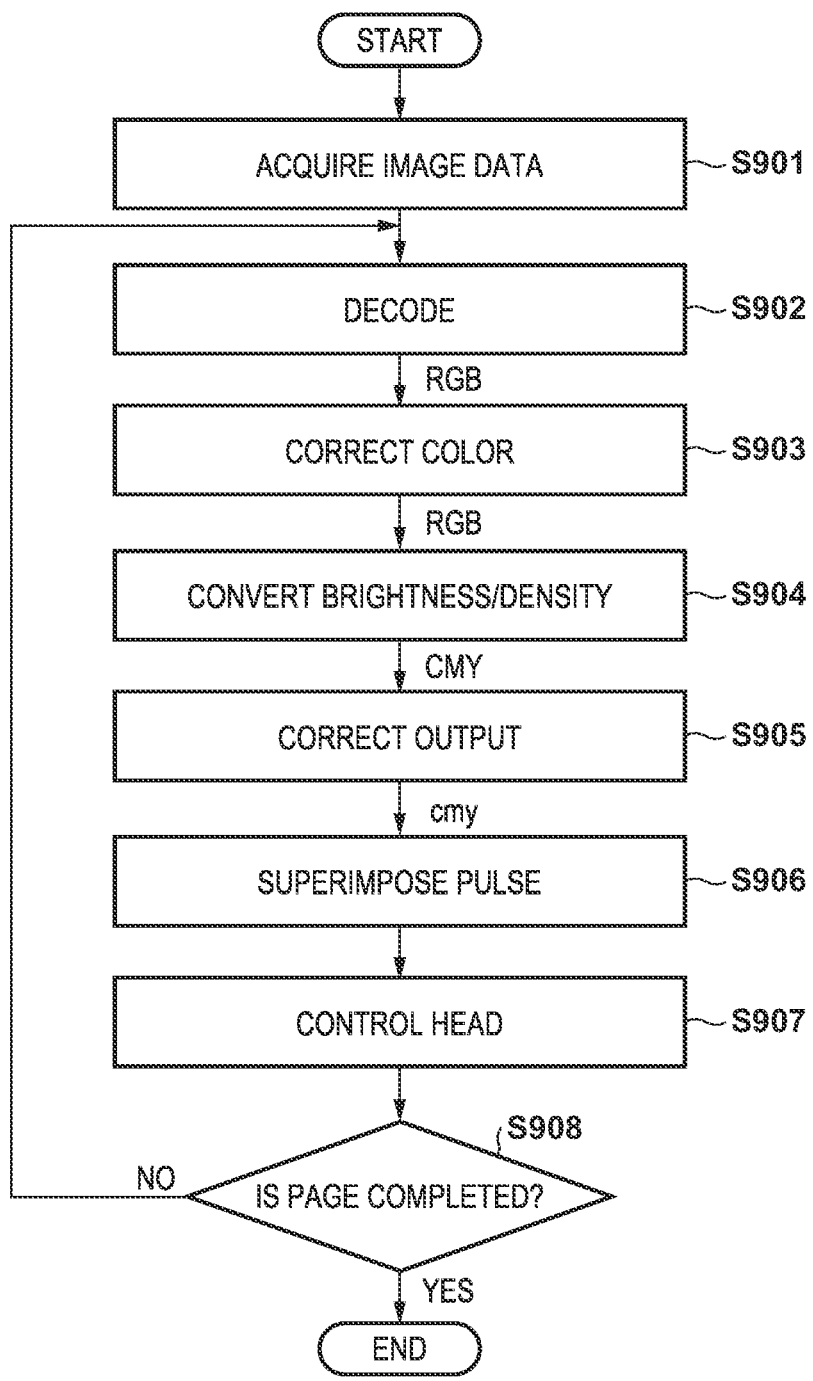
FIG. 9 is a flowchart of processing at the time of image formation according to the embodiment.

FIG. 9 is a flowchart of image processing for implementing the heating pulses according to this embodiment. The procedure shown in FIG. 9 is executed in the processing of step S615 shown in FIG. 6. This procedure is implemented when, for example, the CPU 401 of the image forming apparatus 40 reads out programs and data included in the ROM 403 or the like and executes them. Note that this processing may partially be executed by the image processing accelerator 406.

In step S901, the CPU 401 acquires image data in the print job received in step S614 of FIG. 6. A description will be made here assuming that the image data is acquired on a page basis.

In step S902, the CPU 401 performs decoding processing for the image data. Note that if the image data is not compressed or encoded, this processing may be omitted. The image data changes to RGB data by the decoding processing. As the type of RGB data, for example, standard color information such as sRGB or Adobe® RGB is usable. In this embodiment, the image data may have 8-bit information ranging from 0 to 255 for each color. However, the image data may be formed by information of another number of bits, for example, 16-bit information.

In step S903, the CPU 401 performs color correction processing for the image data. Note that the color correction processing may be performed on the side of the PC 50, or may be performed in the image forming apparatus 40 in a case of performing color correction according to the image forming apparatus 40. The image data after the color correction processing is RGB data. At this point of time, the RGB data has a format of RGB specialized to the image forming apparatus 40, that is, so-called device RGB.

In step S904, the CPU 401 performs brightness/density conversion for the image data using a three-dimensional lookup table. In a general thermal printer, for example, using RGB signals of image data, conversion represented by $$C = 255 - R$$

$$M = 255 - G$$

$$Y = 255 - B$$

is performed. On the other hand, in a case of pulse control according to this embodiment, for example, a control parameter of magenta that constitutes a single magenta (M) color and a control parameter of magenta that suitably constitutes red (R) are different. Hence, to individually set these, brightness/density conversion using a three-dimensional lookup table is preferably performed. Note that although the conversion can be performed by any method, a more preferable example in which a three-dimensional lookup table is used will be described here.

In this embodiment, brightness/density conversion is performed using a three-dimensional lookup table in the following way. In a function 3D_LUT[R][G][B][N] of the three-dimensional lookup table used below, the values of the RGB data are input to variables R, G, and B, respectively. For a variable N, one of the values C, M, and Y to be output is designated. Here, assume that 0, 1, and 2 are designated as C, M, and Y, respectively.

$$C = 3D\_LUT[R][G][B][0]$$

$$M = 3D\_LUT[R][G][B][1]$$

$$Y = 3D\_LUT[R][G][B][2]$$

The above-described 3D_LUT is formed by $256 \times 256 \times 256 \times 3 = 50,331,648$ data tables. Each data is data corresponding to the pulse width applied in p0 to p3 in FIG. 8. Note that to decrease the data amount of the lookup table, for example, the number of grids may be decreased from 256 to 17, and a result may be calculated by an interpolation operation using $17 \times 17 \times 17 \times 3 = 14,739$ data tables. As a matter of course, the number of grids may appropriately be set to, for example, 16, 9, or 8 other than 17. As the interpolation method, any method such as known tetrahedral interpolation can be used. In this embodiment, the three-dimensional lookup table is defined in advance and held in the ROM 403 of the image forming apparatus 40, or the like.

When the above-described three-dimensional lookup table is used, the control parameters of yellow (Y), magenta (M), and cyan (C), which form the colors, can individually be set. That is, it is possible to independently set the control parameters for each of yellow and magenta which form red (R), cyan and yellow which form green (G), magenta and cyan which form blue (B), and yellow, magenta, and cyan which form black (K). Additionally, in a case of using a plurality of pulses when developing one color like cyan (C) or magenta (M), as shown in FIG. 8, the plurality of pulses may be controlled to the same pulse width, or may be controlled to different pulse widths. This makes it possible to more finely control color development and contribute to improvement of the reproducibility of colors.

In step S905, the CPU 401 performs output correction for the converted image data. First, the CPU 401 calculates pulse widths to implement the densities of C, M, and Y using conversion tables corresponding to the colors. Values c, m, and y represent pulse widths corresponding to the values of C, M, and Y, respectively. The conversion tables (conversion formulas) here are defined in advance and held in the ROM 403 of the image forming apparatus 40, or the like.

$$c=1D\_LUT[C]$$

$$m=1D\_LUT[M]$$

$$y=1D\_LUT[Y]$$

Here, the maximum value of the pulse width represented by c is Δt3 in FIG. 8. The maximum value of the pulse width represented by m is Δt2 in FIG. 8. The maximum value of the pulse width represented by y is Δt1 in FIG. 8. The image forming apparatus 40 can modulate the color development intensity in the image material 10 by modulating the pulse widths. For this reason, if the above-described values c, m, and y are smaller than the maximum values, a desired tone can be implemented by appropriately shortening the pulse widths. This processing may be performed using a known means.

In addition, the CPU 401 modulates the heating pulses in accordance with the temperature of the image material 10 (or the printhead 30) acquired by the temperature sensor 45. More specifically, control is performed to shorten the pulse width of the heating pulse used to make the temperature reach the activation temperature along with an increase in the temperature detected by the temperature sensor 45. This processing may be performed using a known means. As for the temperature of the image material 10, the temperature need not always be acquired by the temperature sensor 45. The temperature of the image material 10 or the printhead 30 may be estimated in the PC or the image forming apparatus 40, and control may be performed based on the estimated temperature. The temperature estimation method is not particularly limited, and a known method may be used.

Note that if the temperature of the image material 10 rises beyond an allowable temperature, the image forming operation is preferably waited (interrupted). After the temperature of the image material 10 falls below the allowable temperature, the image formation is preferably resumed. If image formation is waited halfway through image formation of one page, it is not easy to make the image formation density before the waiting match that of after resumption. For this reason, as for the presence/absence of wait, it is preferable to perform determination in step S901, wait on a page basis, and perform resumption after that.

In step S906, the CPU 401 superimposes pulses corresponding to the colors. More specifically, based on the principle shown in FIG. 8, pulses are superimposed as $$p0=\max(y,m,c)$$

$$p1=\max(m,c)$$

$$p2=c$$

$$p3=c$$

A function max(x, y) here means selecting the maximum pulse width of the pulse widths x and y. Hence, for example, the pulse of the signal p0 is a signal corresponding to the OR of the pulses (y, m, c).

Note that to implement this processing as an electric circuit, the processing may be implemented by an arrangement of an OR circuit configured to implement processing represented by $$p0=y+m+c$$

$$p1=m+c$$

$$p2=c$$

$$p3=c$$

Here, y, m, and c are control pulses of the above-described colors. A symbol "+" represents an OR. As described above with reference to FIG. 8, the starting points (rising timings) of the pulses corresponding to the colors match.

In step S907, the CPU 401 controls the printhead 30 via the head controller 405. The pulses p0/p1/p2/p3 shown in FIG. 8 are controlled, thereby forming desired colors on the image material 10.

A case in which the conventional method described concerning step S904 will be described here. For example, assume that the image data acquired in step S901 is (R, G, B)=(255, 0, 0). By the brightness/density conversion of step S904, C=0, M=255, and Y=255 are obtained. Furthermore, c=0 (signal Off), m=Δt2, and y=Δt1 are obtained by output correction of step S905. When the processing of step S906 is performed for these, $$p0=\Delta t2$$

$$p1=\Delta t2$$

$$p2=0$$

$$p3=0$$

are obtained.

As described above, in this embodiment, an image is formed on the image material 10 on a line basis. Hence, image formation and conveyance of the image material 10 are executed simultaneously in parallel.

In step S908, the CPU 401 determines whether printing of the page is completed. If printing is completed (YES in step S908), the processing procedure is ended, and the process advances to processing of the next page or the processing of step S616 in FIG. 6. If printing is not completed (NO in step S908), the process returns to step S902 to continue image formation processing for the page.

As described above, in the example of FIG. 8, the pulse that can be used to develop yellow (Y) in the four pulses p0 to p3 is one pulse p0, two pulses are usable for magenta (M), and four pulses are usable for cyan (C). That is, as compared to the heating pulses shown in FIG. 7, the time for causing a certain image forming layer to develop a color can be used more effectively relative to the heating time (p0 to p3) usable for one pixel, and energy addition can usefully be done. As a result, the area ratio of color development on the image material 10, that is, the color development degree per unit area is improved, and the image quality is improved.

Furthermore, the following points can be obtained as the effects of this embodiment. The first effect is the printing speed. As described above, when compared with the conventional technique shown in FIG. 7, the time necessary for color development of one pixel can be shortened in this embodiment. In the conventional technique shown in FIG. 7, a period of p0 to p6 is necessary for color development of one pixel in accordance with each color, and the needed time is about (7×Δt0). On the other hand, in this embodiment, a period of p0 to p3 is necessary for color development of one pixel in accordance with each color, and the needed time is about (4×Δt0). Hence, the time necessary for color development of one pixel can be shorter in this embodiment. It is therefore possible to shorten the time necessary for image formation, more quickly convey the image material 10 as compared to the conventional technique, and increase the printing speed.

The second effect is power consumption. As compared to the conventional technique shown in FIG. 7, the total time of applied heating pulses is almost equal for each of the primary colors Y, M, and C in this embodiment. Here, the total time of applied heating pulses corresponds to the time of applying a current to the resistors 34, and is almost proportional to power consumption. On the other hand, for R, G, and B that are secondary colors and K that is a tertiary color, the total time of applied heating pulses can be shorter in this embodiment. More specifically, the total time of applied heating pulses is shorter in this embodiment by $\Delta t2$ in red (R), by $\Delta t3$ in green (G), by $(2\times\Delta t3)$ in blue (B), and by $(\Delta t2+2\times\Delta t3)$ in K. Hence, in this embodiment, power consumption necessary for color development can be reduced as compared to the conventional technique.

Modification 1

In the above-described embodiment, an example in which the heating pulses are superimposed to increase the area ratio of color development on the image material 10 and improve color development has been described. In this modification, an example in which the end positions of heating pulses are aligned from the viewpoint of color misregistration will be described.

In the first embodiment, the heating pulses are controlled such that the start positions of the heating pulses of yellow (Y), magenta (M), and cyan (C) are aligned, as shown in FIG. 8. For R, G, and B that are secondary colors and K that is a tertiary color, the heating pulses of yellow (Y), magenta (M), and cyan (C) are superimposed. Hence, the start positions of the heating pulses (the rising positions of the first pulses) match in all colors. On the other hand, the color development timings of yellow (Y), magenta (M), and cyan (C) are different depending on the color development characteristics of the image forming layers. That is, explaining using FIG. 8 as an example, the color development timing of yellow (Y) is close to the application of the pulse p0. Here, the color development timing exists between rising and falling of a pulse for the sake of simplicity. Similarly, the color development timing of magenta (M) is close to the application of the pulse p1. The color development timing of cyan (C) is close to the application of the pulse p3. As described above, since the color development timings of pixel arrays are different on the image material 10 almost simultaneously heated by the printhead 30, color misregistration may occur in the pixel arrays. Such color misregistration is particularly conspicuous when the application timings of p0, p1, and p3 are not sufficiently short with respect to the conveyance speed of the image material 10. If a character or a thin line is included in a printed image, the reproducibility of the image damaged by the color misregistration lowers, and the image quality lowers.

Figure 10:
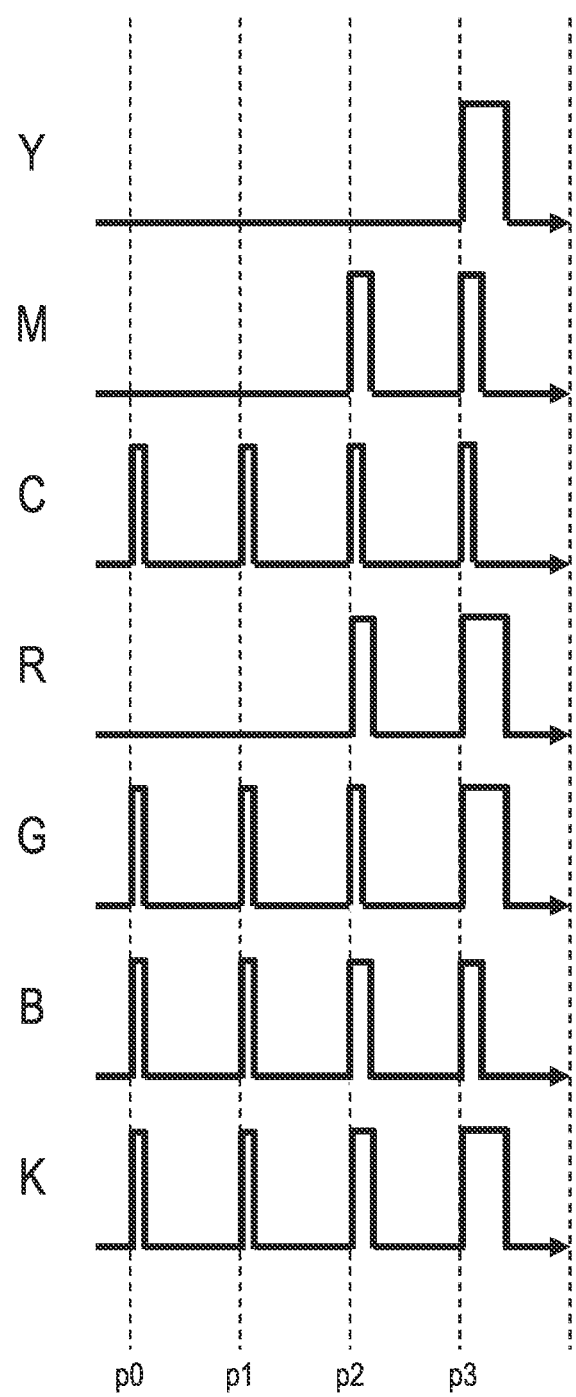
FIG. 10 is a view for explaining an example of the arrangement of heating pulses according to Modification 1.

FIG. 10 is a view for explaining an example of heating pulses according to this modification. In FIG. 10, heating pulses are controlled such that the end positions (color development timings) of the heating pulses used to develop the colors of yellow (Y), magenta (M), and cyan (C) match. For R, G, and B that are secondary colors and K that is a tertiary color, the positions to superimpose the pulses are changed. That is, in the heating pulses, the pulses are superimposed such that the final pulses (ON times) match. With this arrangement, the end positions (color development timings) of the heating pulses match in all colors. More specifically, all colors are developed at the timing of application of the pulse p3. This can align the color development timings of the pixel arrays on the image material 10 heated by the printhead 30 and reduce color misregistration in the pixel arrays.

As described above, in this modification, the end positions of the heating pulses are aligned, thereby improving color misregistration.

Note that in the above-described example, the pulses are superimposed in all of the secondary colors and the tertiary color. However, if there is a little time restriction to form one pixel (one line), superimposition may not be performed in the secondary colors or the tertiary color. For example, an Nth-degree color for which pulses are superimposed may be decided in accordance with the number of primary colors (three colors C, M, and Y in the above example) that constitute the image material 10.

Modification 2

In Modification 1, an example in which the end positions of heating pulses are aligned from the viewpoint of color misregistration has been described. On the other hand, if the end positions of heating pulses are aligned in all colors, the color development efficiency may lower in R, G, and B that are secondary colors and K that is a tertiary color, as compared to the first embodiment. That is, in the heating pulses shown in FIG. 8, since the color development timings of yellow (Y), magenta (M), and cyan (C) are different in R, G, and B that are secondary colors and K that is a tertiary color, the area (surface coverage) contributing to color development on the image material 10 becomes relatively large. On the other hand, in the heating pulses shown in FIG. 10, since the color development timings of yellow (Y), magenta (M), and cyan (C) match in R, G, and B that are secondary colors and K that is a tertiary color, the area (surface coverage) contributing to color development on the image material 10 becomes relatively small. That is, when the heating pulses shown in FIG. 8 and the heating pulses shown in FIG. 10 are compared, the area of color development is larger, and the color development efficiency is higher in FIG. 8. In this modification, an example in which the center positions of heating pulses are aligned from the viewpoint of both the color development efficiency and color misregistration will be described.

Figure 11:
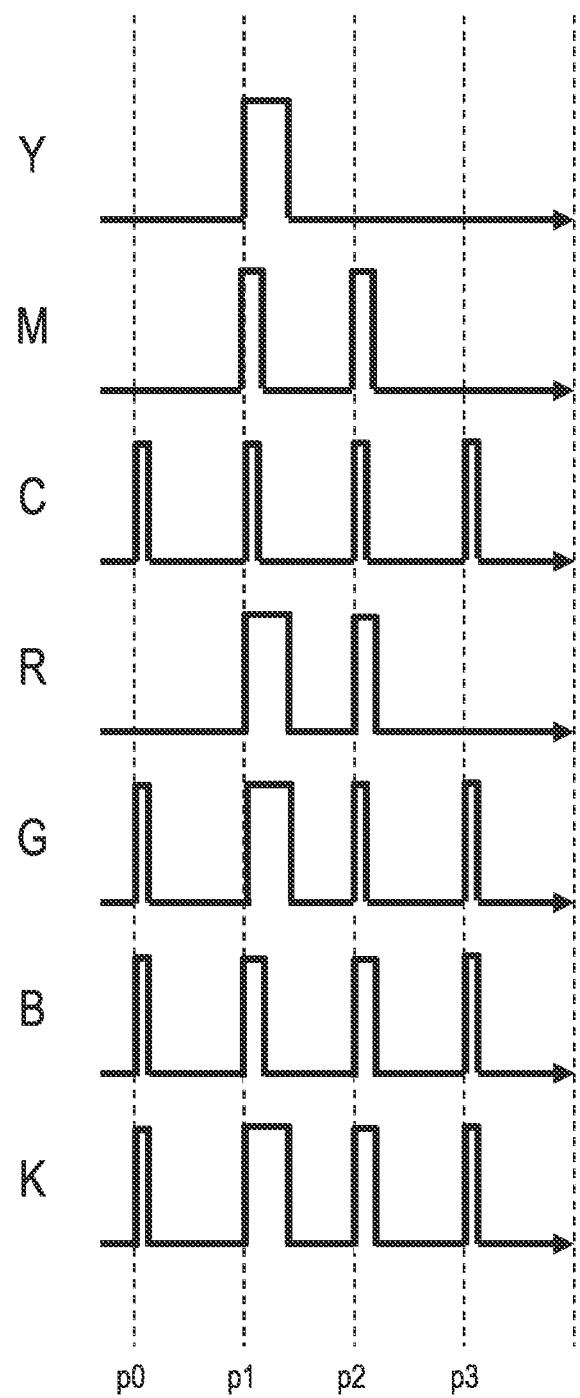
FIG. 11 is a view for explaining an example of the arrangement of heating pulses according to Modification 2.

FIG. 11 is a view for explaining an example of heating pulses according to this modification. In FIG. 11, heating pulses are controlled such that the center positions of the heating pulses (the rising positions of the pulses at the center) used to develop the colors of yellow (Y), magenta (M), and cyan (C) match. For R, G, and B that are secondary colors and K that is a tertiary color, the heating pulses are superimposed at the positions of p1 and p2 of the four pulses p0 to p3. In each of R, G, B, and K shown in FIG. 11, the color development timings of yellow (Y), magenta (M), and cyan (C) are as follows. The color development timing of yellow (Y) is close to the application of the pulse p1. The color development timing of magenta (M) is close to the application of the pulse p2. The color development timing of cyan (C) is close to the application of the pulse p3. As compared to the heating pulses shown in FIG. 8, in the heating pulses shown in FIG. 11, the color development timings of yellow (Y) and magenta (M) do not change relatively, but the color development timings of magenta (M) and cyan (C) become relatively close. For this reason, in the heating pulses shown in FIG. 11, it is possible to improve the color development efficiency as compared to the heating pulses shown in FIG. 10 while relatively reducing color misregistration as compared to the heating pulses shown in FIG. 8.

Note that the description has been made here using p1 as the center position to superimpose the pulses. However, the center position to be used may vary in accordance with the number of pulses in the heating pulses and the arrangement of the pulses corresponding to the colors.

As described above, in this modification, the center positions of the heating pulses are aligned, thereby controlling color development in consideration of both the color development efficiency and color misregistration.

Modification 3

In the above-described embodiment, Modification 1, and Modification 2, since there exists a timing at which all the heating pulses for Y, M, C, R, G, B, and K partially temporally overlap, peak power needed for heating becomes large. More specifically, in the heating signals, timings at which peak power is generated are the pulse timing p0 in FIG. 8, the pulse timing p3 in FIG. 10, and the pulse timing p1 in FIG. 11. In this modification, an example in which concentration of heating pulses is reduced from the viewpoint of peak power will be described.

Figure 12:
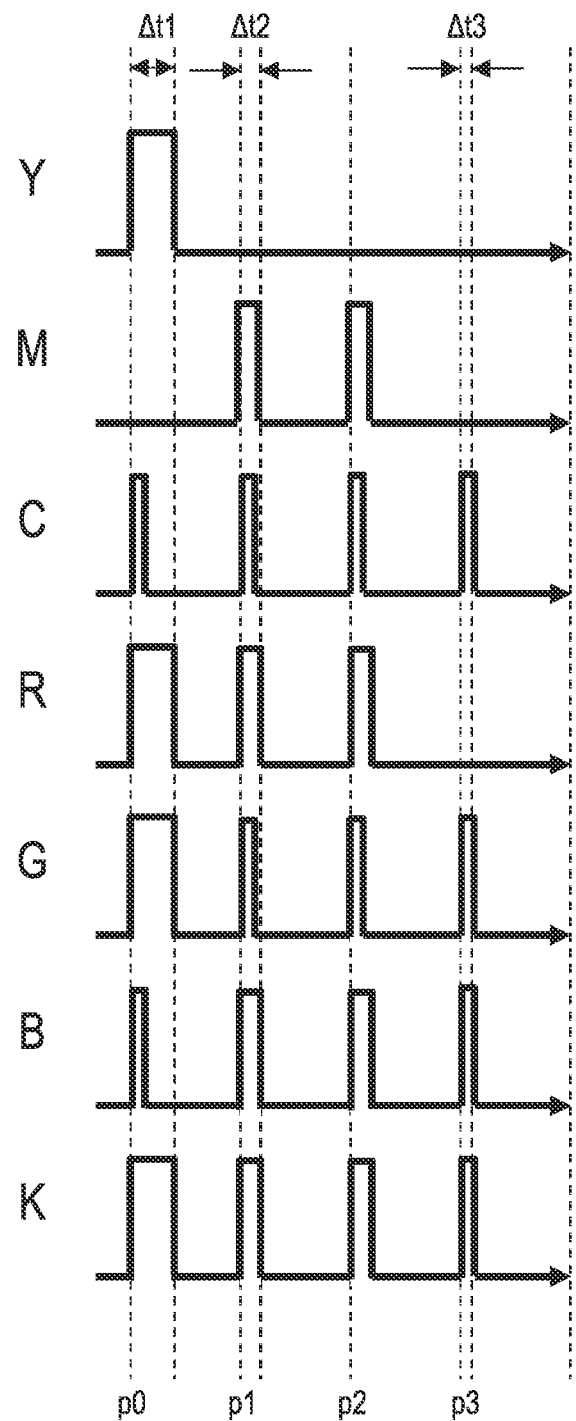
FIG. 12 is a view for explaining an example of the arrangement of heating pulses according to Modification 3.

FIG. 12 is a view for explaining an example of heating pulses according to this modification. In FIG. 12, in each of Y, M, C, R, G, B, and K, the heating pulse contributing to color development of yellow (Y) is p0, the heating pulses contributing to color development of magenta (M) are p1 and p2, and the heating pulses contributing to color development of cyan (C) are p0 to p3. In FIG. 12, there does not exist a timing at which all the heating pulses for Y, M, C, R, G, B, and K partially temporally overlap. Hence, the heating pulses shown in FIG. 12 can reduce peak power necessary for heating, as compared to the above-described heating pulses. Note that the positions to superimpose the pulses may be changed in accordance with allowable peak power.

As described above, in this modification, the positions to superimpose the heating pulses are changed, thereby reducing concentration of the heating pulses and thus suppressing peak power necessary for heating.

Also, in this modification, control is performed such that the heating pulse of Y and the heating pulses of M do not temporally overlap, thereby improving color development of R that is a secondary color, as compared to the first embodiment. When R in FIG. 8 and R in FIG. 11 are compared, the heating pulse contributing to color development of yellow (Y) is p0 and is common. On the other hand, the heating pulses contributing to color development of magenta (M) in R that is a secondary color are p0 and p1 in FIG. 8 an p0 to p2 in FIG. 12. Hence, as compared to the control shown in FIG. 8, color development of magenta (M) in R that is a secondary color is better in the control shown in FIG. 12.

According to the present invention, it is possible to efficiently perform color development of image formation in an image forming apparatus for performing image formation using paper including a plurality of color development layers.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
    a printhead configured to add energy to an image material; and
    a control unit configured to output, based on image data, a signal pattern for controlling energy to be added by the printhead to the image material including a plurality of color development layers that have different color development characteristic and develop colors in accordance with the added energy,
    wherein:
    for development of a first color, the control unit is configured to output a first signal pattern to cause a first color development layer to develop the first color;
    for development of a second color, the control unit is configured to output a second signal pattern to cause a second color development layer to develop the second color; and
    for development of a third color, the control unit is configured to output a third signal pattern to cause the first and the second color development layers to develop the third color, wherein the third signal pattern is a signal pattern of an OR of the first signal pattern and the second signal pattern.

2. The image forming apparatus according to claim 1, wherein the signal pattern defines a heating temperature and a heating time to the image material by a pulse width and the number of pulses.

3. The image forming apparatus according to claim 1, wherein the plurality of color development layers include color development layers corresponding to yellow, cyan, and magenta, respectively.

4. The image forming apparatus according to claim 3, wherein the plurality of color development layers are stacked in an order of yellow, magenta, and cyan from a side on which the energy is added by the printhead.

5. The image forming apparatus according to claim 3, wherein the plurality of color development layers are stacked in an order of cyan, magenta, and yellow from a side on which the energy is added by the printhead.

6. The image forming apparatus according to claim 1, wherein in the first signal pattern and the second signal pattern, the control unit superimposes signals while aligning ON timings of first signals.

7. The image forming apparatus according to claim 1, wherein in the first signal pattern and the second signal pattern, the control unit superimposes signals while aligning ON timings of final signals.

8. The image forming apparatus according to claim 1, wherein in the first signal pattern and the second signal pattern, the control unit superimposes signals while aligning ON timings of signals at center positions.

9. The image forming apparatus according to claim 1, wherein in the first signal pattern and the second signal pattern, the control unit superimposes signals such that ON timings of first signals are not aligned.

10. The image forming apparatus according to claim 1, wherein the control unit is configured to output:
a fourth signal pattern to cause a third color development layer to develop a fourth color; and
a fifth signal pattern to cause the first color development layer, the second color development layer and the third color development layer to develop a fifth color, and
the fifth signal pattern is a signal pattern of an OR of the first signal pattern, the second signal pattern and the fourth signal pattern.

11. A control method of an image forming apparatus including a printhead, comprising:
a control step of outputting, based on image data, a signal pattern for controlling energy to be added by the printhead to an image material including a plurality of color development layers that have different color development characteristics and develop colors in accordance with the added energy,
wherein the control step includes:
for development of a first color, outputting of a first signal pattern to cause a first color development layer to develop the first color;
for development of a second color, outputting of a second signal pattern to cause a second color development layer to develop the second color; and
for development of a third color, outputting of a third signal pattern to cause the first and the second color development layers to develop the third color, wherein the third signal pattern is a signal pattern of an OR of the first signal pattern and the second signal pattern.

12. The control method according to claim 11, wherein the signal pattern defines a heating temperature and a heating time to the image material by a pulse width and the number of pulses.

13. The control method according to claim 11, wherein the plurality of color development layers include color development layers corresponding to yellow, cyan, and magenta, respectively.

14. The control method according to claim 11, wherein in the first signal pattern and the second signal pattern, signals are superimposed while aligning ON timings of first signals.

15. A non-transitory computer-readable storage medium storing a program causing a computer to function as
a control unit configured to output, based on image data, a signal pattern for controlling energy to be added by a printhead to an image material including a plurality of color development layers that have different color development characteristics and develop colors in accordance with the added energy,
wherein the control unit is configured to output:
for development of a first color, the control unit is configured to output a first signal pattern to cause a first color development layer to develop the first color;
for development of a second color, the control unit is configured to output a second signal pattern to cause a second color development layer to develop the second color; and
for development of a third color, the control unit is configured to output a third signal pattern to cause the first and the second color development layers to develop the third color, wherein the third signal pattern is a signal pattern of an OR of the first signal pattern and the second signal pattern.

16. The storage medium according to claim 15, wherein the signal pattern defines a heating temperature and a heating time to the image material by a pulse width and the number of pulses.

17. The storage medium according to claim 15, wherein the plurality of color development layers include color development layers corresponding to yellow, cyan, and magenta, respectively.

18. The storage medium according to claim 15, wherein in the first signal pattern and the second signal pattern, the control unit superimposes signals while aligning ON timings of first signals.

* * * * *